United States Patent
Ohsono et al.

(10) Patent No.: US 12,534,235 B2
(45) Date of Patent: Jan. 27, 2026

(54) MOBILE OBJECT AND BATTERY UNIT

(71) Applicant: SUBARU CORPORATION, Tokyo (JP)

(72) Inventors: Ryuichi Ohsono, Tokyo (JP); Ritsuya Tachikawa, Tokyo (JP); Seiji Tanabe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 160 days.

(21) Appl. No.: 18/538,217

(22) Filed: Dec. 13, 2023

(65) Prior Publication Data

US 2024/0199245 A1    Jun. 20, 2024

(30) Foreign Application Priority Data

Dec. 19, 2022 (JP) .................. 2022-201727

(51) Int. Cl.

| | |
|---|---|
| *B64U 20/98* | (2023.01) |
| *B60L 58/26* | (2019.01) |
| *B64D 33/08* | (2006.01) |
| *H01M 10/613* | (2014.01) |
| *H01M 10/625* | (2014.01) |
| *H01M 10/6568* | (2014.01) |
| *H01M 10/6569* | (2014.01) |
| *B64U 101/45* | (2023.01) |

(52) U.S. Cl.
CPC .............. *B64U 20/98* (2023.01); *B60L 58/26* (2019.02); *B64D 33/08* (2013.01); *H01M 10/613* (2015.04); *H01M 10/625* (2015.04); *H01M 10/6568* (2015.04); *H01M 10/6569* (2015.04); *B60L 2200/10* (2013.01); *B64U 2101/45* (2023.01); *H01M 2220/20* (2013.01)

(58) Field of Classification Search
CPC ...... B60L 58/26; B60L 2200/10; B64D 33/08; B64U 20/98; B64U 2101/45; H01M 10/613; H01M 10/625; H01M 10/6568; H01M 2220/20
See application file for complete search history.

(56) References Cited

U.S. PATENT DOCUMENTS

| | | | |
|---|---|---|---|
| 2015/0037647 A1* | 2/2015 | Nguyen | ............ H01M 10/6555 429/120 |
| 2021/0384567 A1* | 12/2021 | Hom | .................. H01M 10/659 |
| 2022/0212804 A1 | 7/2022 | Sarpotdar | |

FOREIGN PATENT DOCUMENTS

| | | |
|---|---|---|
| CN | 113764769 A | 12/2021 |
| JP | 2010-50000 A | 3/2010 |
| JP | 2012-248363 A | 12/2012 |

OTHER PUBLICATIONS

DE 10 2019 126848 (English translation) (Year: 2019).*
Extended European Search Report issued May 13, 2024 in European Patent Application No. 23215723.0, 9 pages.

* cited by examiner

Primary Examiner — Jonathan Bradford
(74) Attorney, Agent, or Firm — Finnegan, Henderson, Farabow, Garrett & Dunner, LLP

(57) ABSTRACT

A mobile object includes a battery, a coolant, and a discharger. The coolant in a solid state is disposed around the battery and is liquefied by heat transferred from the battery. The discharger discharges the coolant liquefied out of the mobile object.

20 Claims, 5 Drawing Sheets

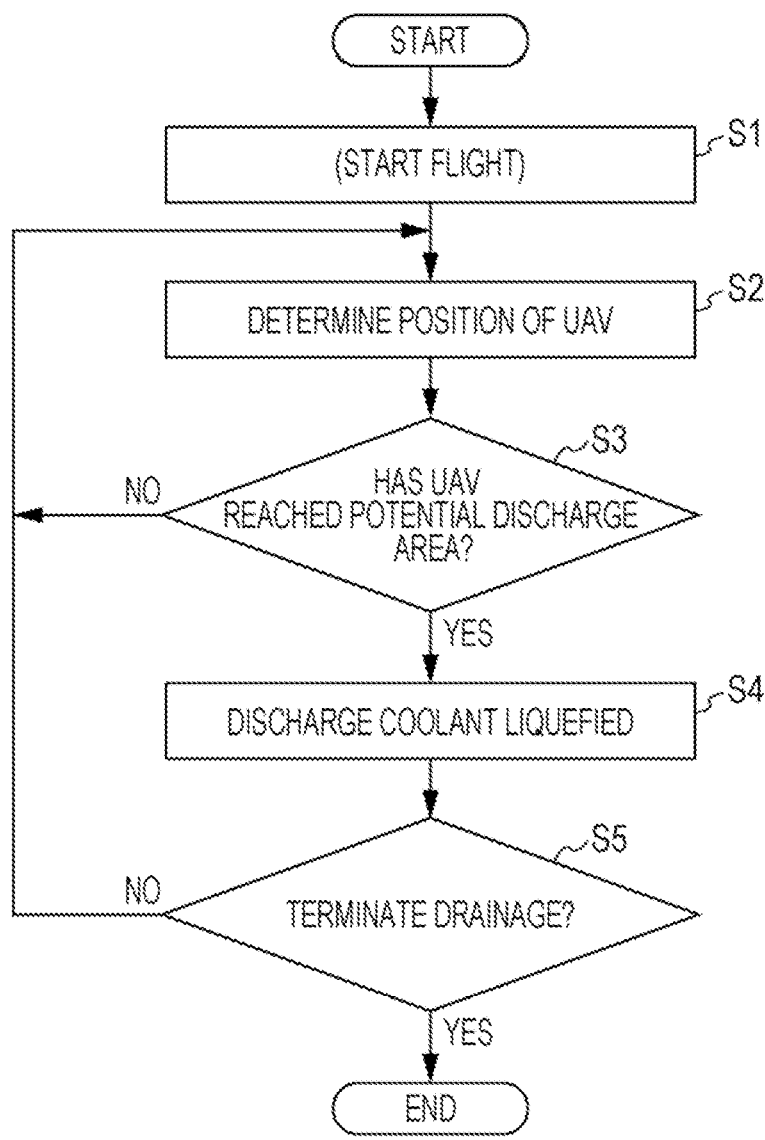

MOBILE OBJECT AND BATTERY UNIT

CROSS-REFERENCE TO RELATED APPLICATIONS

The present application claims priority from Japanese Patent Application No. 2022-201727 filed on Dec. 19, 2022, the entire contents of which are hereby incorporated by reference.

BACKGROUND OF THE INVENTION

Field of the Invention

The disclosure relates to a mobile object and a battery unit.

Description of Background Art

Japanese Unexamined Patent Application Publication (JP-A) No. 2012-248363 describes a technique for cooling battery cells in an apparatus without the use of a cooling device. The entire contents of this publication are incorporated herein by reference.

SUMMARY OF THE INVENTION

According to one aspect of the disclosure, a mobile object includes a battery, a coolant, and a discharger. The coolant in a solid state is disposed around the battery and is liquefied by heat transferred from the battery. The discharger discharges the coolant liquefied out of the mobile object.

According to another aspect of the disclosure, a battery unit includes a battery, a coolant in a solid state, and an accommodation member. The coolant in a solid state is disposed around the battery. The battery and the coolant are accommodated in the accommodation member. The battery, the coolant, and the accommodation member are combined in one module.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

FIG. 4 is a flowchart of a drainage procedure according to the embodiment;

DETAILED DESCRIPTION OF THE EMBODIMENTS

Figure 1:
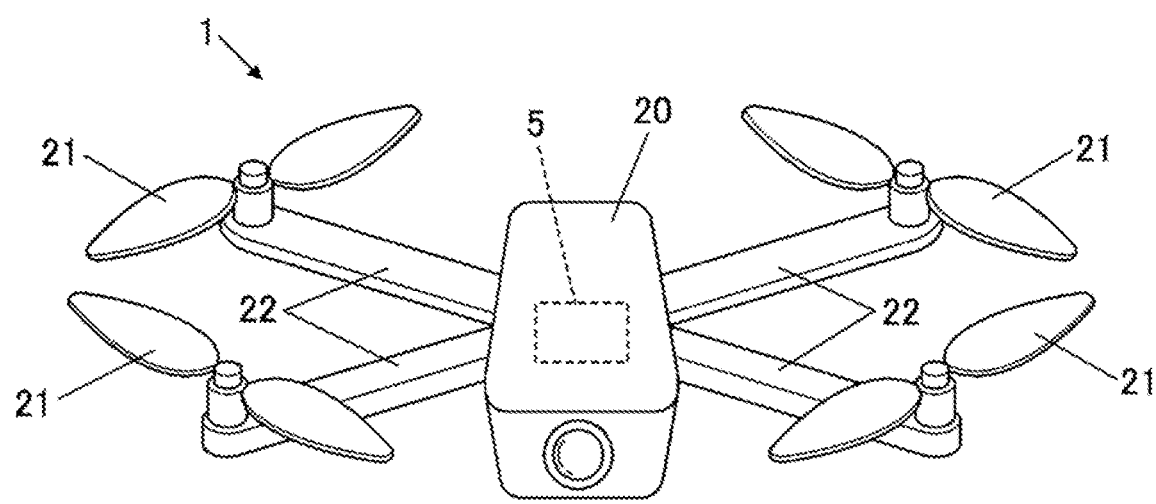
FIG. 1 is a perspective view of an unmanned aerial vehicle according to an embodiment.

Embodiments will now be described with reference to the accompanying drawings, wherein like reference numerals designate corresponding or identical elements throughout the various drawings.

Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale.

Overall Configuration of Unmanned Aerial Vehicle

Figure 2:
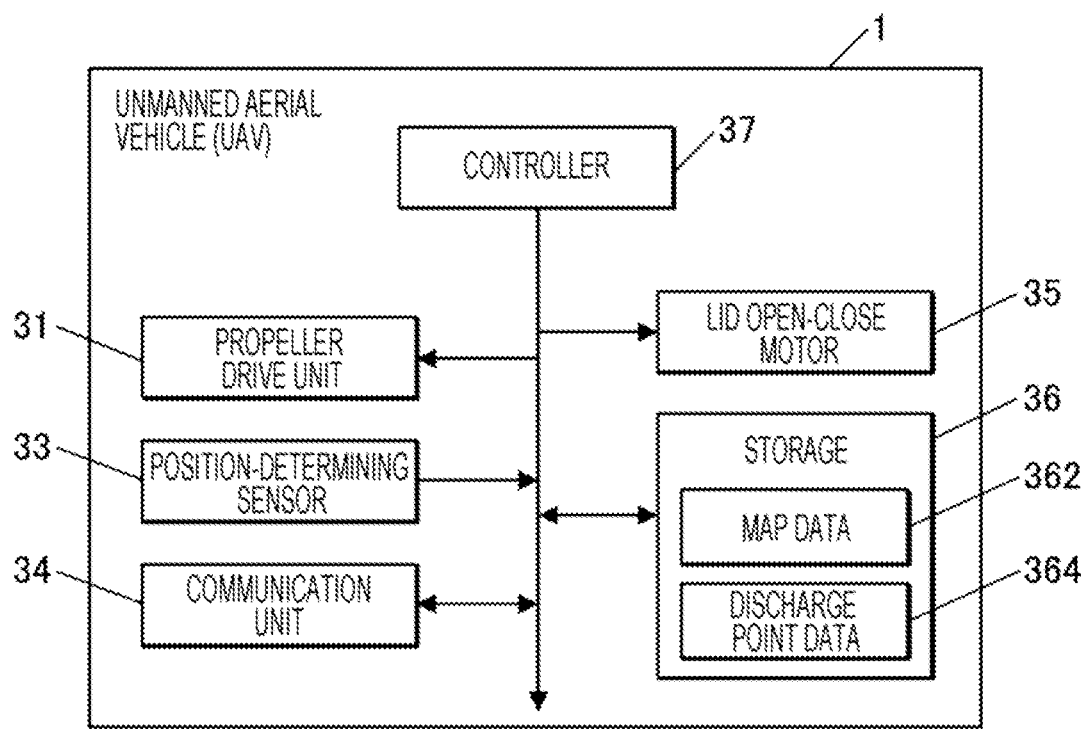
FIG. 2 is a block diagram schematically illustrating the control configuration of the unmanned aerial vehicle according to the embodiment.

FIG. 1 is a perspective view of an unmanned aerial vehicle 1 according to the embodiment, and FIG. 2 is a block diagram schematically illustrating the control configuration of the unmanned aerial vehicle 1 according to the embodiment.

As illustrated in FIG. 1, the unmanned aerial vehicle (UAV) 1 according to the embodiment is an example of a mobile object according to an embodiment of the disclosure. Referring to FIG. 1, the UAV 1 is a multicopter with rotor blades (propeller) 21 that provide thrust to obtain lift. The UAV 1 according to the embodiment is designed to perform autonomous flight in accordance with a flight program written in advance. In some embodiments, however, the UAV 1 is controlled in accordance with a flight control signal transmitted from a remote location.

For example, the UAV 1 includes a main body 20 and the rotor blades 21.

The main body 20 is box-shaped (a rectangular parallelepiped) and houses a battery unit 5, which provides power to modules constituting the UAV 1.

The rotor blades 21 are provided to tips of four arms 22, which extend from the main body 20 in respective directions.

Referring to FIG. 2, the UAV 1 includes a propeller drive unit 31, a position-determining sensor 33, a communication unit 34, a lid open-close motor 35, a storage 36, and a controller 37.

The propeller drive unit 31 includes motors and electromagnetic brakes (not illustrated) that are provided for the respective rotor blades 21. In accordance with a control signal from the controller 37, the propeller drive unit 31 drives (rotates) the rotor blades 21 and applies brakes to the rotor blades 21.

The position-determining sensor 33 is, for example, a Global Navigation Satellite System (GNSS) receiver. The position-determining sensor 33 determines the present position (including altitude) of the UAV 1 and outputs the result to the controller 37.

The communication unit 34 is a communication device capable of transmitting and receiving various kinds of information through a communication network. When the UAV 1 is remotely operated, the communication unit 34 and a flight control device in a remote location exchange various kinds of information with each other.

The lid open-close motor 35 enables a discharge lid 523 of the battery unit 5, which will be described later, to be opened and closed. The lid open-close motor 35 opens and closes the discharge lid 523 in accordance with a control signal from the controller 37.

The storage 36 is memory, such as random-access memory (RAM) or read-only memory (ROM). Various kinds of programs and data are stored in the storage 36, which also serves as a work area for the controller 37. In the embodiment, map data 362 and discharge point data 364 are stored in the storage 36.

The map data 362 is map information at least including the information about the (planned) flight area of the UAV 1. The map data 362 may include topographic information (e.g., information concerning mountains and rivers) and geographic information concerning land use (e.g., roads, railroads, architectural structures, and cultivated fields).

The discharge point data 364 is data (positional information) about potential discharge areas where a coolant 54 can be discharged. The coolant 54 in the embodiment is water and will be described later. The potential discharge areas in the embodiment refer to regions where the coolant 54 can be discharged midair with a negligible adverse effect on the environment. Examples of the potential discharge areas include lakes, marshes, and the sea. The discharge point data 364 may be any kind of information that can be used to locate the potential discharge areas. The discharge point data 364 may be stored in association with the map data 362 or may be stored as part of the map data 362.

Programs for carrying out a drainage procedure are stored in advance in the storage 36 in the embodiment. The drainage procedure will be described later.

The controller 37 in one example is a central processing unit (CPU) and is configured to control the operation of the modules constituting the UAV 1. For example, the controller 37 retrieves a program stored in advance in the storage 36 and runs the program to execute various kinds of processing.

Configuration of Battery Unit

Figure 3A:
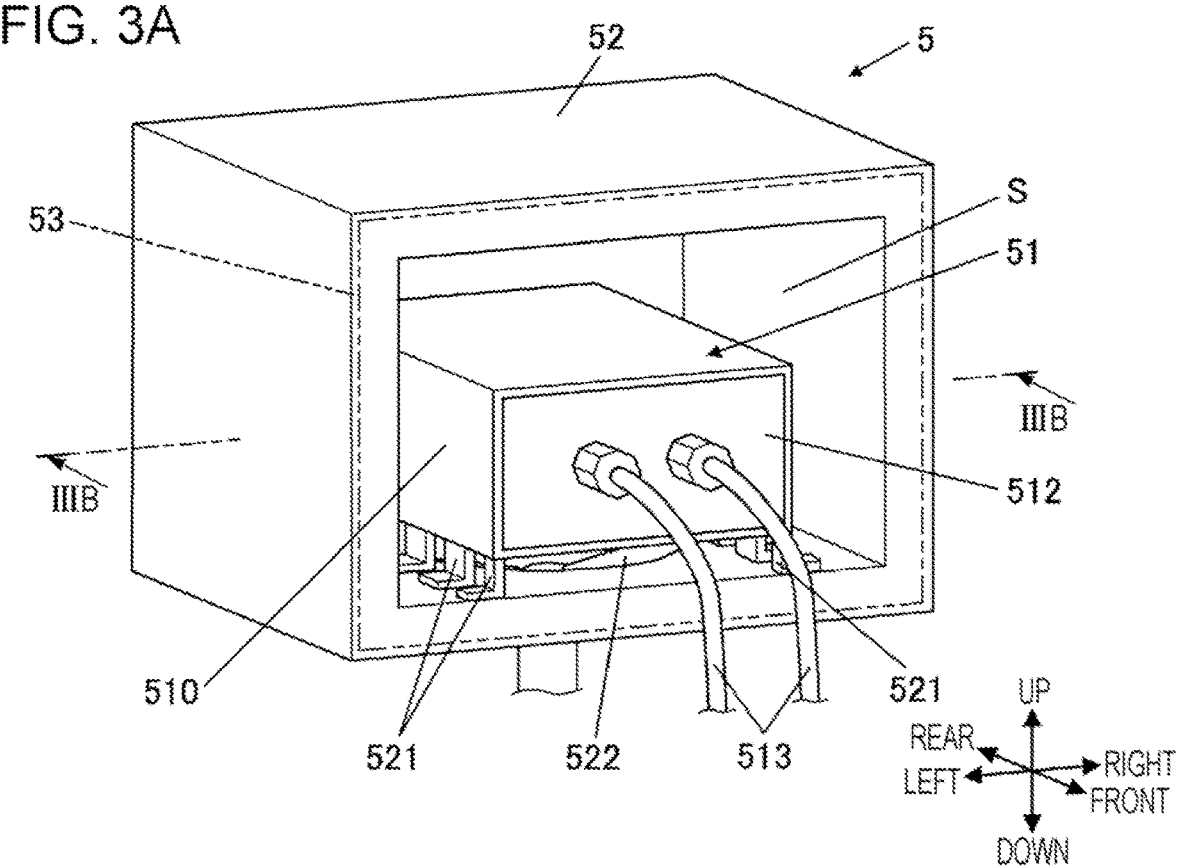
FIG. 3A is a perspective view of a battery unit according to the embodiment.
Figure 3B:
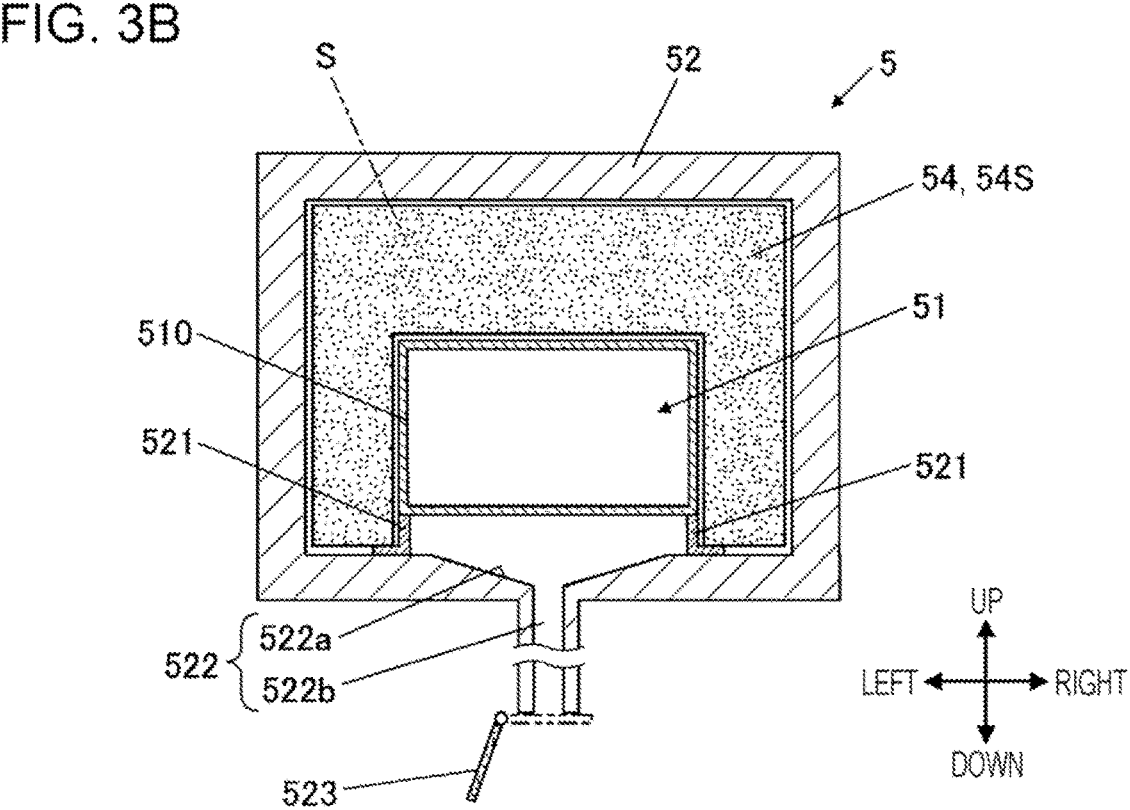
FIG. 3B is a sectional view of the battery unit taken along line IIIB-IIIB in FIG. 3A.

FIG. 3A is a perspective view of the battery unit 5, and FIG. 3B is a sectional view of the battery unit 5 taken along line IIIB-IIIB in FIG. 3A. The coolant 54, which will be described later, is not illustrated in FIG. 3A. A battery main body is not illustrated in FIG. 3B.

Referring to FIGS. 3A and 3B, the battery unit 5 includes a battery (battery main body) 51 and a case 52. The battery 51 supplies power to the modules (e.g., the propeller drive unit 31 and the controller 37) and is accommodated in the case 52.

The battery 51 includes a battery housing 510 and a front panel 512. The battery housing 510 is substantially a rectangular parallelepiped elongated in the front-and-rear direction than in the other directions. The front surface of the battery housing 510 is covered with the front panel 512. Feeder cables 513 are coupled to the front panel 512. The battery housing 510 and the front panel 512 are members having high thermal conductivity and are made of, for example, metal. The inner part of the battery 51 is hermetically sealed by the battery housing 510 and the front panel 512. In one example, the coolant 54, which will be described later, is a material that does not cause current leakage from the battery 51, when liquefied. In this instance, the inner part of the battery 51 is not necessarily hermetically sealed by the battery housing 510 and the front panel 512.

The case 52 is, for example, box-shaped (a rectangular parallelepiped) and has an opening in its front. The opening in the front of the case 52 can be sealed liquid-tight with a lid member 53 so that at least liquid leakage can be prevented. The lid member 53 is detachable or rotatable. The case 52 includes a heat insulating material to stop heat from going into or out of the case 52. In some embodiments, an insulating material is not integrated into the case 2 as long as the case 52 and an insulating material are capable of suitably suppressing heat transfer into or out of the case 52. For example, the insulating material may be disposed separately on an inner surface or an outer surface of the case 52.

The battery 51 is supported by legs 521, which are disposed to stand on a lower surface inside the case 52. The legs 521 are aligned in two rows to support the right end and the left end of the battery 51, with a predetermined amount of space between the two rows on the right and left sides. The legs 521 in each of the right and left rows are aligned with a space therebetween in the front-and-rear direction.

The lower surface inside the case 52 has a cavity 522, which is funnel-shaped. The cavity 522 is composed of a conical cavity 522a and a cylindrical cavity 522b. The conical cavity 522a is located on the upper side and tapers downward. The cylindrical cavity 522b extends downward from a lower end of the conical cavity 522a.

The conical cavity 522a is located substantially in the middle of the lower surface of the case 52 and between the row of the legs 521 on the right and the row of the legs 521 on the left such that an opening is defined below the battery 51 disposed on the legs 521.

The opening at the lower end of the cylindrical cavity 522b leads to the outside (underside) of the UAV 1 and can be closed with the discharge lid 523. The cylindrical cavity 522b is by default closed with the discharge lid 523. The lid open-close motor 35 (see FIG. 2) can expose the cylindrical cavity 522b by opening the discharge lid 523.

The battery 51 is disposed on and fastened to the legs 521 within the case 52. Accordingly, the battery 51 is placed in the case 52 at the center between the right side and the left side of the case 52. That is, the case 52 defines a space S around the battery 51, and the battery 51 is accommodated in the case 52.

The coolant 54 is disposed in the space S defined around the battery 51 within the case 52. For example, the space S in the case 52 is filled with the coolant 54 such that the right side, the left side, and the upper side of the battery 51 are covered with the coolant 54. The coolant 54 is inverted U-shaped when viewed from the front.

The coolant 54 in the embodiment is ice (solid) that becomes water (liquid) by absorbing heat from the battery 51 during operation. The coolant 54 has a notably high latent heat capacity with respect to the battery 51 and therefore enables a change of state to occur.

The coolant 54 may be any material (substance) that can facilitate heat removal from the battery 51 through a change of state (solid to liquid). For example, the coolant 54 may be a liquid containing an additive that improves, for example, cooling efficiency. The liquid may be passed through a filter to recover the additive when being discharged. For example, the coolant 54 is a substance that places a negligible load on the environment. The coolant 54 in the space S is not limited to a solid of a particular shape, and the number of coolants used as the coolant 54 in the space S is not limited. For example, a large number of coolants 54 may be packed into the space S.

It is sufficient that the coolant 54 in a solid state be close to the battery 51 so that heat of the battery 51 can be transferred to the coolant 54. For example, the coolant 54 in a solid state is disposed at least on the upper side of the battery 51.

The battery unit 5 is in the form of a cassette (cartridge) and can be removed from the main body of the UAV 1. That is, the battery 51, the case 52, and the coolant 54 in a solid state (or further the lid member 53) are combined in one module (unit), which is herein referred to as the battery unit 5. The battery 51, the case 52, and the coolant 54 in a solid state, as a single entity, can be attached to and detached from the main body of the UAV 1. As will be described later, all or part of the coolant 54 is liquefied and discharged by the time the battery unit 5 including the battery 51 after use is removed from the main body.

Drainage Procedure

The following describes how the UAV 1 in flight carries out drainage.

FIG. 4 is a flowchart of a drainage procedure.

Drainage is the process by which the coolant 54 liquefied is discharged out of the UAV 1 in flight. The controller 37 starts the drainage procedure by retrieving a relevant program from the storage 36 and running the program.

The coolant 54 in a solid state and the coolant 54 liquefied may be hereinafter denoted by 54S and 54L respectively, to be distinguished from each other.

As a first step of the drainage procedure illustrated in FIG. 4, the UAV 1 under the control of the controller 37 begins flying autonomously in accordance with a predetermined flight program (Step S1). The UAV 1 begins flying autonomously along a predetermined route to reach its destination.

The drainage procedure may be incorporated into the flight program.

The controller 37 acquires information about the present position of the UAV 1 (Step S2).

For example, the controller 37 causes the position-determining sensor 33 to determine the position of the UAV 1.

The controller 37 then determines whether the UAV 1 has reached a potential discharge area where the coolant 54 liquefied can be discharged (Step S3).

For example, when the positional information acquired in Step S2 is included in the discharge point data 364 stored in the storage 36, the controller 37 determines that the UAV 1 has reached a potential discharge area.

When the controller 37 determines that the UAV 1 has yet to reach any potential discharge area (No in Step S3), a return to Step S2 is made.

Steps S2 and S3 may be performed without the use of the positional information obtained by the position-determining sensor 33. That is, any other methods may be adopted as long as whether the UAV 1 has reached a potential discharge area is determined. For example, such steps may involve the use of image information obtained by an imaging apparatus or may involve the use of azimuth information obtained by an azimuth sensor and/or distance information obtained by a distance sensor.

When determining in Step S3 that the UAV 1 has reached a potential discharge area (Yes in Step S3), the controller 37 causes the drainage to occur such that the coolant 54L liquefied is discharged from the battery unit 5 (Step S4). While the UAV 1 is flying, heat generated by the battery 51 of the battery unit 5 is cooled by the coolant 54S disposed around the battery 51. The coolant 54 is liquefied by heat transferred from the battery 51 and melts in the case 52. The coolant 54 liquefied eventually accumulates in the cavity 522.

In this state, the lid open-close motor 35 is driven by the controller 37 and opens the discharge lid 523 to enable the drainage to occur. As a result, the lower end of the cylindrical cavity 522b, which is part of the cavity 522 and has been closed with the discharge lid 523, is opened to enable the coolant 54L retained in the case 52 to be discharged out of the UAV 1 through the cavity 522. After being discharged, the coolant 54L falls to the ground in the potential discharge area.

The controller 37 then determines whether it is time to terminate the drainage procedure (Step S5). When it is not time to terminate the drainage procedure (No in Step S5), a return to Step S2 is made.

When it is time to terminate the drainage procedure (e.g., when the UAV 1 arrives at the destination) (Yes in Step S5), the controller 37 terminates the drainage procedure.

An embodiment has been described in which the coolant 54 in a solid state is disposed around the battery 51 and is liquefied by heat transferred from the battery 51. The coolant 54L liquefied is then discharged from the case 52 to the outside. That is, the battery 51 is cooled by the coolant 54, and the coolant 54 used to cool the battery 51 liquefies and is then discharged from the case 52 to the outside.

This eliminates the addition of complex cooling equipment including a cooling apparatus (e.g., a cooling fan or a radiator) and a system of pipes for the cooling apparatus and thus eliminates energy (electric power) for the operation of the cooling equipment. The weight of the body of the UAV 1 is thus reduced and the energy in the battery 51 can be efficiently used.

When running out of cooling capacity, the coolant 54 liquefies. The coolant 54 liquefied is then discharged. As a result, the weight of the body (the battery unit 5) is reduced while the UAV 1 is flying.

That is, the weight reduction and the suitable cooling of the battery 51 can be achieved at the same time.

According to the embodiment, when the positional information acquired by the position-determining sensor 33 is included in the discharge point data 364 stored in the storage 36; that is, when the UAV 1 has reached a potential discharge area, the coolant 54L liquefied is discharged.

Thus, the coolant 54 can be discharged safely and without any significant environmental impact caused by discharging the coolant 54L liquefied.

According to the embodiment, the case 52, in which the battery 51 and the coolant 54 are accommodated, includes an insulating material disposed around the coolant 54.

This eliminates or reduces the possibility that heat outside the case 52 is transferred to the coolant 54. The coolant 54 in turn can provide suitable cooling of the battery 51.

According to the embodiment, the battery 51, the coolant 54 in a solid state disposed around the battery 51, and the case 52 in which the battery 51 and the coolant 54 are accommodated are combined in one module.

The battery 51, the coolant 54, and the case 52, as a single entity, can thus be attached to and detached from the main body of the UAV 1. That is, the battery unit 5 including the battery 51 in a charged state and packed with the coolant 54 can be easily installed in the main body of the UAV 1. This provides ease of replacing or recharging the battery 51 and replenishing the coolant 54.

Modifications

In the embodiment described above, the lower end of the cavity 522 of the case 52 is opened to let the coolant 54L fall, thereby discharging the coolant 54L liquefied to the outside. In some embodiments, however, Modifications 1 to 3, which will be described below, are adopted so that the coolant 54L will not fall to the ground as it is. For example, Modifications 1 to 3 may be adopted when the coolant 54L is to be discharged in large amounts.

Modification 1

Figure 5:
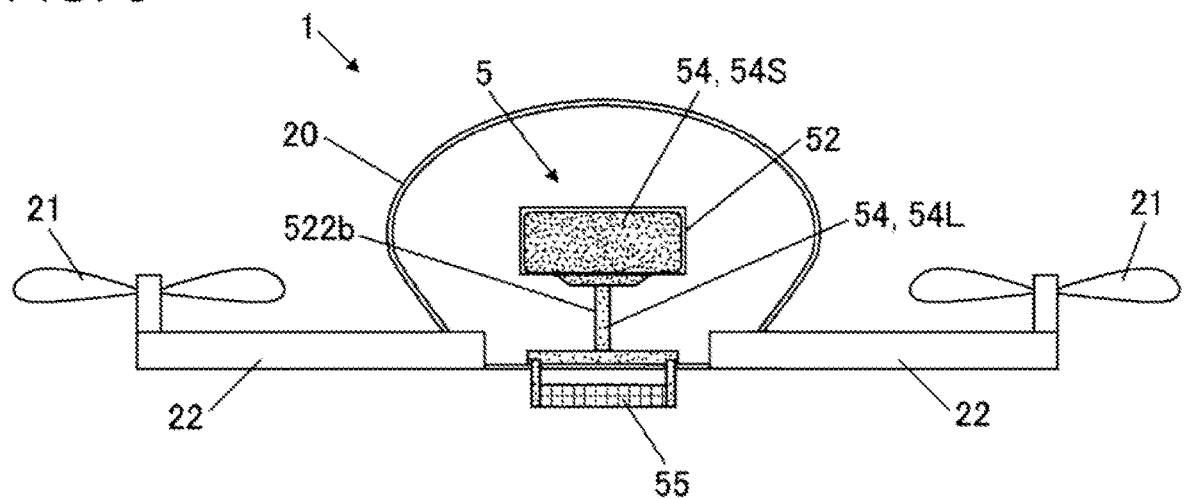
FIG. 5 schematically illustrates Modification 1 of the unmanned aerial vehicle according to the embodiment.

Referring to FIG. 5, a fibrous member 55 in the form of cloth may be coupled to the lower end of the cavity 522 (the cylindrical cavity 522b). The fibrous member 55 on the UAV 1 is exposed to the outside.

The coolant 54L liquefied flows through the cylindrical cavity 522b and is then absorbed by the fibrous member 55. The coolant 54L absorbed by the fibrous member 55 is vaporized upon contact with the airstream around the UAV 1 in flight. This speeds up the process of volatilization of the coolant 54L liquefied and eliminates or reduces the possibility that the coolant 54L will fall to the ground as it is.

The fibrous member 55 may be made of any material that can absorb the coolant 54L liquefied, and the fibrous member 55 may have any form that helps promote the vaporization of the coolant 54L in contact with the airstream. The fibrous member 55 may be extendable and retractable, and when appropriate, the fibrous member 55 extends out from the body of the UAV 1 so that the coolant 54L can be vaporized.

In this instance, the discharge lid 523 at the lower end of the cylindrical cavity 522b is optional.

Modification 2

Figure 6:
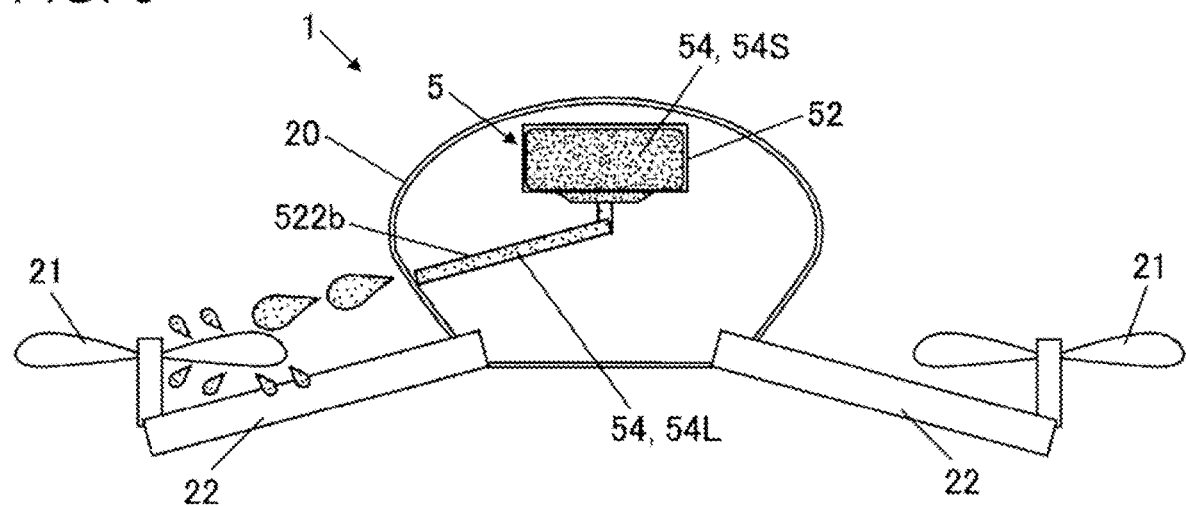
FIG. 6 schematically illustrates Modification 2 of the unmanned aerial vehicle according to the embodiment.

Referring to FIG. 6, the coolant 54L liquefied may be discharged toward one of the rotor blades 21 such that the coolant 54L is diffused by the airstream generated by the rotor blade 21.

The tip of the cylindrical cavity 522b (and a pipe leading thereto) is oriented toward any one of the rotor blades 21, with an opening provided in close proximity to the rotor blade 21. While being diffused by the rotor blade 21, the coolant 54L in a fine spray is emitted into the atmosphere. This eliminates or reduces the possibility that the coolant 54L will fall to the ground as it is.

In this instance, the discharge lid 523 at the lower end of the cylindrical cavity 522b is optional.

Modification 3

Figure 7:
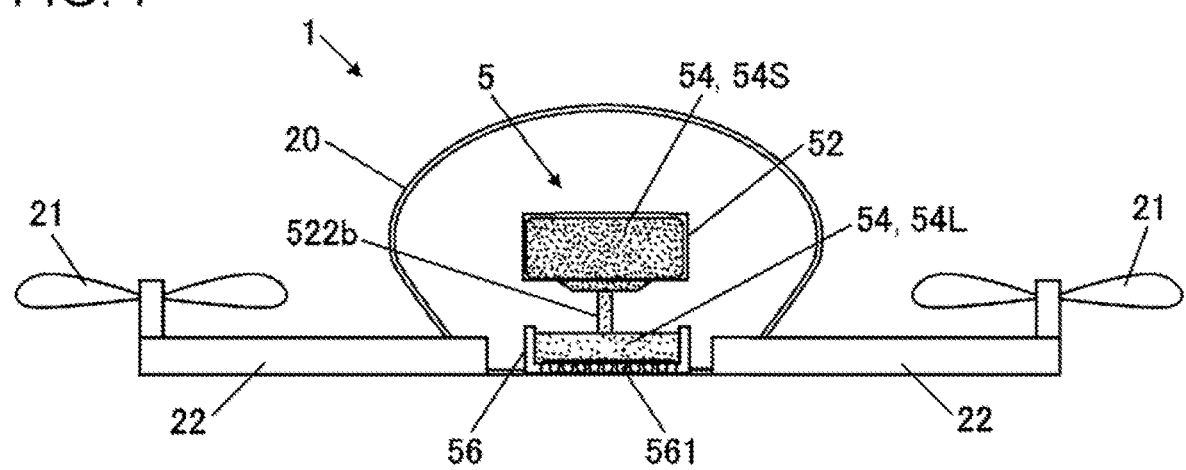
FIG. 7 schematically illustrates Modification 3 of the unmanned aerial vehicle according to the embodiment.

Referring to FIG. 7, the coolant 54L liquefied may be collected in a pan (drip tray) 56 and then vaporized (evaporated) by a heating element 561.

The pan 56 is disposed at the lower end of the cavity 522 (the cylindrical cavity 522b). The heating element 561 is, for example, a heating wire and is disposed in the bottom of the pan 56. The heating element 561 disposed as above vaporizes the coolant 54L collected in the pan 56. This eliminates or reduces the possibility that the coolant 54L will fall to the ground as it is.

In this instance, the discharge lid 523 at the lower end of the cylindrical cavity 522b is optional.

OTHERS

Although an embodiment of the disclosure has been described so far, the disclosure is not limited to the embodiment and the modifications thereof.

For example, the battery unit 5 (the battery 51, the coolant 54, and the case 52) in the embodiment described above are combined in one module, which is herein referred to as the battery unit 5. In some embodiments, however, the battery 51, the coolant 54, and the case 52 are not combined in one module (unit). In this instance, when the coolant 54 is replenished, for example, the coolant 54 alone can be put into the case 52 by opening the lid member 53 in the front of the case 52.

In the embodiment described above, the coolant 54L liquefied is discharged in the potential discharge area or vaporized. When the coolant 54 is a substance that places a negligible load on the environment, the coolant 54L liquefied may be discharged at any place as it is irrespective of its state.

Although the unmanned aerial vehicle has been described above as an example of the mobile object according to an embodiment of the disclosure, the mobile object may be an aircraft (a manned aircraft) operated by an occupant (pilot).

Moreover, the disclosure is widely applicable, in addition to aircrafts, to other mobile objects equipped with batteries. Examples of such mobile objects include vehicles, watercraft, and toys thereof.

The details described above in the embodiment may be changed as appropriate within a range not departing from the spirit of the disclosure.

Batteries are typically used as a source of energy for driving mobile objects, such as multicopters. Such a battery becomes hot due to heat generated in the process of releasing energy. With this in view, the battery is equipped with a cooling system. Common examples of the cooling system include an air cooling system configured to cool a battery by using a cooling fan and a refrigerant cooling system configured to cool a battery by using a pump to circulate refrigerant cooled by a cooling device such as a radiator.

Such a cooling system consumes energy to operate a cooling device, such as a cooling fan or a pump. Installation of the cooling device leads to an increase in the weight of the body of the mobile object such that the mobile object consumes more energy in flight.

Japanese Unexamined Patent Application Publication (JP-A) No. 2012-248363 describes a technique for cooling battery cells in an apparatus without the use of a cooling device. The technique involves the use of a cool storage medium (refrigerant pack) that is placed in close proximity to the battery cells. The cool storage medium is able to be in close contact with battery cells to cool the battery cells.

According to the technique described in JP-A No. 2012-248363, the cool storage medium is left unremoved in the apparatus after running out of cooling capacity. Discharging the coolant that has run out of cooling capacity realizes further weight reduction of the apparatus. It is desirable to provide suitable battery cooling and weight reduction.

According to the embodiment of the disclosure, a coolant used for cooling of a battery and liquefied is then discharged from a discharger to the outside. This provides suitable battery cooling and weight reduction.

Obviously, numerous modifications and variations of the present invention are possible in light of the above teachings. It is therefore to be understood that within the scope of the appended claims, the invention may be practiced otherwise than as specifically described herein.

The invention claimed is:

1. A mobile object, comprising:
   a battery;
   a coolant in a solid state disposed around the battery and configured to be liquefied by heat transferred from the battery;
   a discharger configured to discharge the coolant liquefied out of the mobile object;
   a storage configured to store information about a potential discharge area for the coolant; and
   a position determiner configured to acquire positional information of the mobile object,
   wherein the discharger is configured to discharge the coolant liquefied when the positional information acquired by the position determiner is included in the information about the potential discharge area stored in the storage.

2. The mobile object according to claim 1, wherein the discharger comprises a vaporization member configured to vaporize the coolant liquefied.

3. The mobile object according to claim 1, further comprising:
an accommodation member in which the battery and the coolant are accommodated,
wherein the accommodation member comprises an insulating material disposed around the coolant.

4. The mobile object according to claim 3, wherein the battery, the coolant, and the accommodation member are combined in one module.

5. The mobile object according to claim 2, further comprising:
an accommodation member in which the battery and the coolant are accommodated,
wherein the accommodation member comprises an insulating material disposed around the coolant.

6. A mobile object, comprising:
a battery;
a coolant in a solid state disposed around the battery;
a discharger configured to discharge the coolant liquefied by heat transferred from the battery out of the mobile object;
a storage comprising circuitry configured to store information about a potential discharge area for the coolant; and
a position-determining sensor comprising circuitry configured to acquire positional information of the mobile object,
wherein the discharger is configured to discharge the coolant liquefied by the heat when the positional information acquired by the position-determining sensor is included in the information about the potential discharge area stored in the circuitry of the storage.

7. The mobile object according to claim 6, wherein the discharger comprises a vaporization member configured to vaporize the coolant liquefied.

8. The mobile object according to claim 6, further comprising:
a case configured to accommodate the battery and the coolant.

9. The mobile object according to claim 8, wherein the case comprises an insulating material configured to be positioned around the coolant.

10. The mobile object according to claim 8, wherein the battery, the coolant, and the case are combined in one module.

11. The mobile object according to claim 9, wherein the battery, the coolant, and the case are combined in one module.

12. The mobile object according to claim 8, wherein the battery, the coolant, and the case are combined in one module comprising a cartridge configured to be removed from the mobile object.

13. The mobile object according to claim 9, wherein the battery, the coolant, and the case are combined in one module comprising a cartridge configured to be removed from the mobile object.

14. The mobile object according to claim 6, wherein the circuitry of the storage includes map data and discharge point data.

15. The mobile object according to claim 6, further comprising:
a controller comprising circuitry configured to control the discharger, the circuitry of the storage and the circuitry of the position-determining sensor.

16. The mobile object according to claim 6, wherein the discharger comprises a vaporization member comprising a fibrous material configured to absorb and promote vaporization of the coolant liquefied by the heat.

17. The mobile object according to claim 6, wherein the circuitry of the storage comprises at least one of random-access memory and read-only memory.

18. The mobile object according to claim 6, wherein the circuitry of the position-determining sensor comprises a Global Navigation Satellite System receiver.

19. The mobile object according to claim 6, wherein the circuitry of the controller comprises a central processing unit.

20. An unmanned aerial vehicle, comprising:
the object of claim 6.

* * * * *